United States Patent
Herbert et al.

(10) Patent No.: US 8,984,765 B2
(45) Date of Patent: Mar. 24, 2015

(54) PROCESS FOR PRODUCING DISPERSION POWDERS

(75) Inventors: Michael Herbert, Burghausen (DE); Jochen Ring, Herxheim (DE); Stefan Killat, Burghausen (DE); Bernd Gerstenberger, Burghausen (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 14/236,568

(22) PCT Filed: Jul. 25, 2012

(86) PCT No.: PCT/EP2012/064560
§ 371 (c)(1),
(2), (4) Date: Jan. 31, 2014

(87) PCT Pub. No.: WO2013/017491
PCT Pub. Date: Feb. 7, 2013

(65) Prior Publication Data
US 2014/0237847 A1    Aug. 28, 2014

(30) Foreign Application Priority Data
Aug. 1, 2011   (DE) .................. 10 2011 080 235

(51) Int. Cl.
*F26B 3/12*   (2006.01)
*B01D 1/18*   (2006.01)
*F26B 11/02*  (2006.01)
*B01J 2/04*   (2006.01)
(Continued)

(52) U.S. Cl.
CPC ............... *F26B 11/026* (2013.01); *B01J 2/04* (2013.01); *B01J 2/30* (2013.01); *C08J 3/122* (2013.01); *C08J 3/124* (2013.01); *C08J 2331/04* (2013.01)
USPC ........................................ 34/372; 34/314

(58) Field of Classification Search
CPC ............ F26B 3/10; F26B 3/12; B01D 1/16; B01D 1/18; B01J 2/04; B01J 2/30; C08J 3/12; C08J 3/122; C08J 3/124; B05B 3/10
USPC ............... 34/314, 372, 332, 353, 354, 356
See application file for complete search history.

(56) References Cited

U.S. PATENT DOCUMENTS 3,481,546 A    12/1969  Nielsen
3,815,252 A *  6/1974   Skuce et al. .............. 34/319
(Continued)

FOREIGN PATENT DOCUMENTS

DE   88493 A1     3/1972
EP   0690278 A1   1/1996
(Continued)

OTHER PUBLICATIONS

English language patent abstract corresponding to DD 88493 A1.
(Continued)

*Primary Examiner* — Jiping Lu
(74) *Attorney, Agent, or Firm* — RatnerPrestia

(57) ABSTRACT

A process for producing dispersion powders by spray drying of aqueous polymer dispersions and addition of antiblocking agents in a rotary atomization dryer, wherein the antiblocking agent is conveyed by delivery air, wholly or partly, into an annular gap which is formed by a moulding arranged concentrically around the housing of the rotary atomizer, and which ends at a distance above the upper edge of the atomizer plate of the rotary atomizer.

12 Claims, 1 Drawing Sheet

(51) Int. Cl.
  *B01J 2/30* (2006.01)
  *C08J 3/12* (2006.01)

(56) References Cited

U.S. PATENT DOCUMENTS

| | | | | |
|---|---|---|---|---|
| 6,020,403 | A | * | 2/2000 | Eck et al. ................ 523/340 |
| 2008/0098933 | A1 | | 5/2008 | Killat |
| 2011/0114745 | A1 | | 5/2011 | Buisson et al. |

FOREIGN PATENT DOCUMENTS

| | | |
|---|---|---|
| EP | 1 916 275 | 4/2008 |
| FR | 1546920 A | 11/1968 |
| FR | 2929136 A1 | 10/2009 |

OTHER PUBLICATIONS

English language patent abstract corresponding to EP 0 690 278 A1.

* cited by examiner

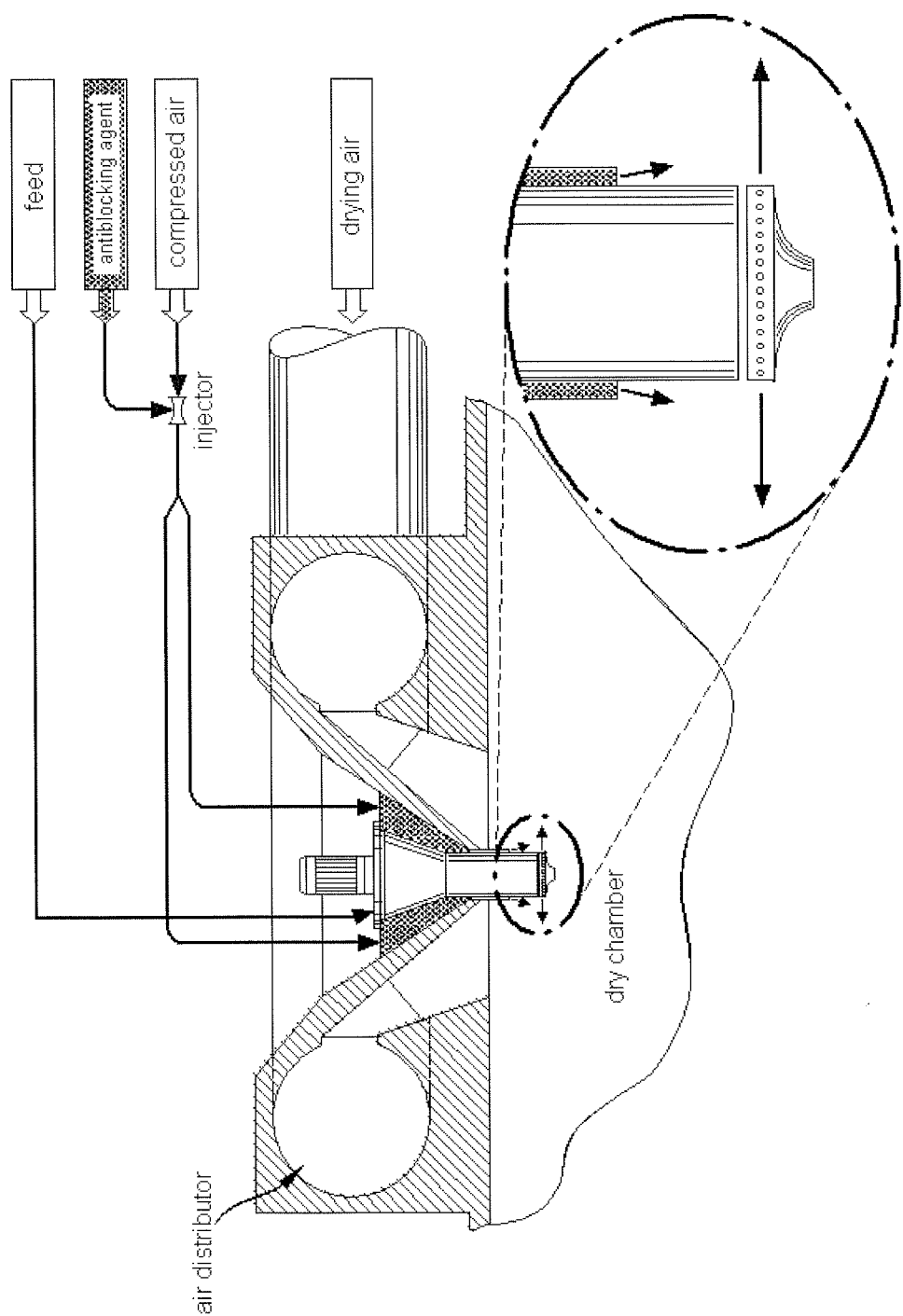

PROCESS FOR PRODUCING DISPERSION POWDERS

CROSS REFERENCE TO RELATED APPLICATIONS

This application is the national phase filing of international patent application No. PCT/EP2012/064560, filed 25 Jul. 2012, and claims priority of German application number 10 2011 080235.5, filed 1 Aug. 2011, the entireties of which applications are incorporated herein by reference.

FIELD OF THE INVENTION

The invention relates to a process for producing dispersion powders by spray-drying aqueous polymer dispersions in a rotary atomization dryer.

BACKGROUND OF THE INVENTION

Dispersion powders are polymer powders obtainable by spray-drying the corresponding aqueous polymer dispersions. A distinction is made here between dispersion powders which are redispersible in water and those which do not have this property. Water-redispersible polymer powders are generally obtained by drying the corresponding aqueous polymer dispersions in the presence of a drying aid (generally a protective colloid) and of antiblocking agent. Because of the protective colloid content, irreversible adhesion of the polymer particles is firstly prevented in the course of the drying operation, since the polymer particles are encased by the water-soluble protective colloid particles. Secondly, this protective colloid matrix, which redissolves when the polymer powder is dispersed in water, has the effect that the polymer particles are again present in the aqueous redispersion with the particle size of the starting dispersion.

To minimize powder blocking, especially in the case of dispersion powders based on polymers having a glass transition temperature Tg of <25° C., and to improve the free flow and flowability, antiblocking agents (anticaking agents) are added to the dispersion powders in the course of production thereof.

The antiblocking agent (ABA) serves to ensure free flow and storage stability of the polymer powder obtained after spray drying (dispersion powder). Antiblocking agents are an essential constituent of the dispersion powder especially when blocking of the powder or caking on the dryer wall are to be expected because of a low glass transition temperature of the polymer or high hygroscopicity. The powdering of the particle surface with antiblocking agent, because of relatively low agglomerate formation, more particularly, also reduces the proportion of coarse particles, which has a very advantageous effect on the overall drying operation and on the properties of the powder (for example free flow and storage stability).

Dispersion powders of this kind are used in many kinds of applications, including in coating compositions and in adhesives for a wide variety of different substrates. One example is use as a binding powder for particulate natural materials (Vinnex$^R$ powders from Wacker Chemie AG). The use thereof in chemical products for construction is widespread, frequently in conjunction with mineral binders (Vinnapas$^R$ powders from Wacker Chemie AG). Examples thereof are construction adhesives, especially tile adhesives, renders and mortar compounds, paints, spackling compounds, leveling compounds, thermal insulation composite systems and jointing mortars. The advantage of the water-redispersible dispersion powders lies particularly in the option of using them in prefabricated, storable dry mixes, optionally together with mineral binders such as cement, and of making them ready for use only immediately before use by addition of water. Dry mixes of this kind can be more easily transported (without a water content) compared to systems in paste form and offer advantages in storage, for example insensitivity to frost and resistance to microbe infestation.

The dispersion powders are produced in known spray dryers, by atomizing the polymer dispersion (feed), generally at the upper end of the dryer, by means of a one-phase nozzle under pressure, or atomizing it together with compressed air using a two-phase nozzle or multiphase nozzle, or atomizing it by means of a rotary atomizer. For spray-drying by means of a rotary atomizer, EP 690278 A1 proposes introducing the antiblocking agent with the conveying gas below the atomizer disk of a rotary atomization dryer. For this purpose, the antiblocking agent is conducted to the rotary atomizer with conveying air in a conveying line which runs transversely through the dryer. This construction has the disadvantage that the transverse pipe is very prone to soiling and the rigid construction hinders the operation of the dryer. For example, this construction prevents the use of a clearing blower to clean the dryer walls.

The problem addressed was that of providing a process for spray-drying aqueous polymer dispersions with addition of antiblocking agent by means of a rotary atomizer, by means of which very substantially homogeneous and complete coverage of the polymer particles with antiblocking agent is obtained.

BRIEF DESCRIPTION OF THE DRAWING

FIG. 1 is a schematic representation of an exemplary spray-drying tower with installed rotary atomizer (rotary atomization dryer) suitable for use according to the invention.

DETAILED DESCRIPTION OF THE INVENTION

The invention provides a process for producing dispersion powders by means of spray-drying of aqueous polymer dispersions and addition of antiblocking agent in a rotary atomization dryer, characterized in that the antiblocking agent is conveyed by means of compressed air, wholly or partly, into an annular gap which is formed by a cylindrical formed part arranged concentrically around the housing of the rotary atomizer, and which ends at a distance above the upper edge of the atomizer disk.

The base polymers for the dispersion powders are introduced in the form of aqueous polymer dispersions thereof for the spray-drying. Suitable base polymers for the dispersion powders are those based on one or more ethylenically unsaturated monomers selected from the group comprising vinyl esters of carboxylic acids having 1 to 15 carbon atoms, methacrylic esters or acrylic esters of carboxylic acids with unbranched or branched alcohols having 1 to 15 carbon atoms, olefins or dienes, vinylaromatics or vinyl halides.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of alpha-branched monocarboxylic acids having 5 to 13 carbon atoms, for example VeoVa9$^R$ or VeoVa10$^R$ (trade names of Momentive). Particular preference is given to vinyl acetate.

Preferred methacrylic esters or acrylic esters are esters of unbranched or branched alcohols having 1 to 15 carbon atoms, such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Particular preference is given to methyl acrylate, methyl methacrylate, n-butyl acrylate and 2-ethylhexyl acrylate.

Preferred olefins or dienes are ethylene, propylene and 1,3-butadiene. Preferred vinylaromatics are styrene and vinyltoluene. A preferred vinyl halide is vinyl chloride.

It is optionally also possible to copolymerize 0.05 to 50% by weight, preferably 1 to 10% by weight, based on the total weight of the base polymer, of auxiliary monomers. Examples of auxiliary monomers are ethylenically unsaturated mono- and dicarboxylic acids, ethylenically unsaturated carboxamides, ethylenically unsaturated sulfonic acids or salts thereof, precrosslinking comonomers such as polyethylenically unsaturated comonomers, postcrosslinking comonomers such as N-methylolacrylamide, epoxy-functional comonomers, silicon-functional comonomers.

Examples of suitable homo- and copolymers are vinyl acetate homopolymers, copolymers of vinyl acetate with ethylene, copolymers of vinyl acetate with ethylene and one or more further vinyl esters, copolymers of vinyl acetate with one or more further vinyl esters, copolymers of vinyl acetate with ethylene and acrylic esters, copolymers of vinyl acetate with ethylene and vinyl chloride, copolymers of vinyl chloride and ethylene and optionally one or more further vinyl esters, styrene-acrylic ester copolymers, styrene-1,3-butadiene copolymers.

Preference is given to vinyl acetate homopolymers; copolymers of vinyl acetate with 1 to 50% by weight of one or more further comonomers from the group of the vinyl esters having 1 to 12 carbon atoms in the carboxyl radical, such as vinyl propionate, vinyl laurate, vinyl esters of alpha-branched carboxylic acids having 5 to 13 carbon atoms, such as VeoVa9$^R$, VeoVa10$^R$, VeoVa11$^R$; copolymers of vinyl acetate with 1 to 40% by weight of ethylene; copolymers of vinyl acetate with 1 to 40% by weight of ethylene and 1 to 50% by weight of one or more further comonomers from the group of the vinyl esters having 1 to 12 carbon atoms in the carboxyl radical, such as vinyl propionate, vinyl laurate, vinyl esters of alpha-branched carboxylic acids having 5 to 13 carbon atoms, such as VeoVa9$^R$, VeoVa10$^R$, VeoVa11$^R$; copolymers of vinyl acetate, 1 to 40% by weight of ethylene and preferably 1 to 60% by weight of (meth)acrylic esters of unbranched or branched alcohols having 1 to 15 carbon atoms, especially methyl methacrylate, methyl acrylate, n-butyl acrylate or 2-ethylhexyl acrylate; copolymers with 30 to 75% by weight of vinyl acetate, 1 to 30% by weight of vinyl laurate or vinyl esters of an alpha-branched carboxylic acid having 5 to 13 carbon atoms, and 1 to 30% by weight of (meth)acrylic esters of unbranched or branched alcohols having 1 to 15 carbon atoms, especially methyl methacrylate, methyl acrylate, n-butyl acrylate or 2-ethylhexyl acrylate, which may also contain 1 to 40% by weight of ethylene; copolymers with one or more vinyl esters having 1 to 12 carbon atoms in the carboxyl radical, such as vinyl acetate, vinyl propionate, vinyl laurate, vinyl esters of alpha-branched carboxylic acids having 5 to 13 carbon atoms, such as VeoVa9$^R$, VeoVa10$^R$, VeoVa11$^R$, 1 to 40% by weight of ethylene and 1 to 60% by weight of vinyl chloride; where the polymers may each also contain the auxiliary monomers mentioned in the amounts mentioned, and the figures in % by weight add up to 100% by weight in each case.

Preference is also given to (meth)acrylic ester polymers, such as copolymers of n-butyl acrylate or 2-ethylhexyl acrylate or copolymers of methyl methacrylate with n-butyl acrylate and/or 2-ethylhexyl acrylate and optionally ethylene; styrene-acrylic ester copolymers with one or more monomers from the group of methyl acrylate, ethyl acrylate, propyl acrylate, n-butyl acrylate, 2-ethylhexyl acrylate; styrene-1,3-butadiene copolymers; where the polymers may also contain the auxiliary monomers mentioned in the amounts mentioned, and the figures in % by weight add up to 100% by weight in each case.

The monomer selection and the selection of the proportions by weight of the comonomers is generally made so as to result in a glass transition temperature Tg of –50° C. to +50° C. The glass transition temperature Tg of the polymers can be determined in a known manner by means of differential scanning colorimetry (DSC). The Tg can also be calculated beforehand as an approximation by means of the Fox equation. According to Fox T. G., Bull. Am. Physics Soc. 1, 3, page 123 (1956): $1/Tg = x_1/Tg_1 + x_2/Tg_2 + \ldots + x_n/Tg_n$, where $x_n$ is the mass fraction (% by wt./100) of the monomer n, and $Tg_n$ is the glass transition temperature in Kelvin of the homopolymer of the monomer n. Tg values for homopolymers are listed in Polymer Handbook 2nd Edition, J. Wiley & Sons, New York (1975).

The base polymers are preferably prepared by the emulsion polymerization process. The polymerization temperature is preferably between 40° C. and 100° C., more preferably between 60° C. and 90° C. In the copolymerization of gaseous comonomers such as ethylene, 1,3-butadiene or vinyl chloride, it is also possible to work under pressure, generally between 5 bar and 100 bar.

The polymerization is preferably initiated with the water-soluble initiators or redox initiator combinations which are commonly used for emulsion polymerization.

The polymerization is effected in the presence of protective colloids and/or emulsifiers. Suitable protective colloids for the polymerization are polyvinyl alcohols; polyvinyl acetals; polyvinylpyrrolidones; polysaccharides in water-soluble form, such as starches (amylose and amylopectin), celluloses and the carboxymethyl, methyl, hydroxyethyl, hydroxypropyl derivatives thereof, dextrins and cyclodextrins; proteins such as casein or caseinate, soya protein, gelatin; lignosulfonates; synthetic polymers such as poly(meth)acrylic acid, copolymers of (meth)acrylates with carboxy-functional comonomer units, poly(meth)acrylamide, polyvinylsulfonic acids and the water-soluble copolymers thereof; melamine-formaldehydesulfonates, naphthalene-formaldehydesulfonates, styrene-maleic acid and vinyl ether-maleic acid copolymers. Preference is given to using partly hydrolyzed or fully hydrolyzed polyvinyl alcohols having a hydrolysis level of 80 to 100 mol %, especially partly hydrolyzed polyvinyl alcohols having a hydrolysis level of 80 to 95 mol % and a Happier viscosity of 1 to 30 meas (Happier method at 20° C., DIN 53015) in 4% aqueous solution.

If polymerization is effected in the presence of emulsifiers, the amount thereof is 1 to 5% by weight, based on the amount of monomers. Suitable emulsifiers are anionic, cationic or nonionic emulsifiers, for example anionic surfactants such as alkyl sulfates having a chain length of 8 to 18 carbon atoms, alkyl or alkylaryl ether sulfates having 8 to 18 carbon atoms in the hydrophobic radical and up to 40 ethylene oxide or propylene oxide units, alkyl- or alkylarylsulfonates having 8 to 18 carbon atoms, esters and monoesters of sulfosuccinic acid with monohydric alcohols or alkylphenols, or nonionic surfactants such as alkyl polyglycol ethers or alkylaryl polyglycol ethers having 8 to 40 ethylene oxide units.

On completion of the polymerization, residual monomers can be removed by postpolymerization employing known methods, generally by redox catalyst-initiated postpolymerization. Volatile residual monomers can also be removed by means of distillation, preferably under reduced pressure, and optionally while passing inert entraining gases through or over, such as air, nitrogen or water vapor.

The aqueous polymer dispersions thus obtainable have a solids content of 30 to 75% by weight, preferably of 50 to 60% by weight.

The production process for the polymer dispersion is described, for example, in EP 1916275 A1, the details from which in this regard form part of the application (incorporated here by reference).

For production of the dispersion powders, the aqueous dispersions are dried by means of spray-drying in the presence of antiblocking agent, optionally after addition of protective colloids as a drying aid to the polymer dispersion. In general, the drying aid (protective colloid) is used in a total amount of 0.5 to 30% by weight, based on the base polymer in the dispersion. Suitable drying aids are the substances enumerated above as protective colloids. Further constituents of the dispersion powders which may be added to the polymer dispersion are further additives, for example defoamers, hydrophobizing agents and rheological additives. The polymer dispersion modified with protective colloid and optionally further additives, i.e. the mixture of polymer dispersion, protective colloid and optionally further additives to be dried, is also referred to in the technical jargon as "feed".

Suitable antiblocking agents (anticaking agents) are known to those skilled in the art, for example aluminum silicates such as kaolin, bentonite, fumed silica or precipitated silica, which may optionally be hydrophobized, talc, clays, calcium sulfate, carbonates such as calcium carbonate, magnesium carbonate and Ca/Mg carbonate, barium sulfate. It is also possible to use mixtures of antiblocking agents. The antiblocking agents are used generally in an amount of 0.1 to 30% by weight, preferably 2 to 30% by weight, more preferably 7 to 30% by weight, based in each case on the total weight of the polymeric constituents of the polymer dispersion to be atomized. In the case of fumed silica or precipitated silica, preferably 0.1 to 2% by weight, based on the polymeric constituents of the polymer dispersion to be atomized, is used. The proportion of the polymeric constituents in the polymer dispersion to be atomized is composed of the base polymer of the polymer dispersion and optionally the protective colloid component.

The spray-drying is effected in customary spray-drying systems equipped with an atomizer disk (rotary atomization dryer), in which the energy for vaporization of the aqueous phase is transferred from the drying gas to the polymer dispersion (feed) to be dried by conduction of heat. In the case of rotary atomization dryers, the drying tower is equipped with a rotary atomizer. A rotary atomizer has a drive unit (motor), an atomizer housing surrounding the drive shaft, and an atomizer disk. The drying is effected by intimate mixing of the polymer dispersion sprayed with the drying gas. The drying gas used is generally air.

To accelerate the drying, the drying gas is preheated, preferably to an inlet temperature of 130° C. to 210° C. (hot air). Preferably, the polymer dispersion (feed) to be dried is also preheated, generally to a feed temperature of 50° C. to 98° C. The spray-drying is preferably effected by the cocurrent principle. This involves atomizing the polymer dispersion (feed) by means of an atomizer disk. The atomizer disk may have different geometries and may, for example, be a perforated disk, nozzle disk, plate disk, or comprise atomizer caps or be a multi-row perforated disk (perforated cylinder).

The polymer dispersion and the drying gas are fed in at the upper end of the spray dryer, generally a cylindrical tower (dryer tower) having a volume of up to several hundred cubic meters. At the lower end, the dried polymer powder is discharged with the drying gas and isolated by means of a filter precipitator and/or cyclone precipitator. The outlet temperature of the drying gas is about 45° C. to 120° C., according to the system, Tg of the resin and desired drying level.

The antiblocking agent is at least partly added continuously and simultaneously, but spatially separately from the polymer dispersion to be atomized (feed). For this purpose, the antiblocking agent is conveyed into the dryer tower for drying in a conveying line by means of a conveying gas, generally air (conveying air). The conveying gas velocity is generally 20 to 50 m/s, preferably 30 to 50 m/s.

In the process according to the invention, the conveying air laden with antiblocking agent is conveyed from above into an annular gap disposed in the atomizer housing of the rotary atomizer. The annular gap is formed by a formed part arranged in a concentric cylinder around the atomizer housing, which fully surrounds the atomizer housing and which ends at a distance above the upper edge of the atomizer disk. The formed part is generally a metal sheet (steel sheet). The formed part (metal sheet) generally surrounds the atomizer housing in the form of a cylindrical tube at a distance corresponding to the gap width of the annular gap.

The gap width, i.e. the distance of the formed part from the atomizer housing, is preferably 0.5 cm to 10 cm, more preferably 0.5 cm to 5 cm. The distance of the lower end of the formed part from the upper edge of the atomizer disk depends on the dimensions of the spray-drying system and is preferably 0.01 to 1.0 m from the upper edge of the atomizer disk.

In a particularly preferred embodiment, the formed part (metal sheet) which bounds the annular gap can be moved vertically in order to optimize the distance from the upper edge of the atomizer disk. It is generally advantageous to introduce the antiblocking agent as close as possible to the atomizer disk. On the other hand, the addition must not be effected so close to the atomizer disk that the antiblocking agent penetrates into the still-wet polymer powder particle and thus becomes ineffective. With the vertically movable annular gap, the distance from the upper edge of the atomizer disk can be optimized for the polymer dispersion to be dried and the antiblocking agent to be used.

In general, a proportion of 0.5 to 100% by weight of the antiblocking agent is supplied via the annular gap. When a mixture of antiblocking agents is used, the procedure may be to add one antiblocking agent completely via the annular gap and not to feed the further antiblocking agent to the annular gap. The proportion of antiblocking agent which is not fed to the annular gap can be added to the hot air supplied for drying in the hot air channel and/or conveyed directly into the dryer tower and/or added subsequently to the dried dispersion powder, for example after the filter precipitation and/or cyclone precipitation.

Antiblocking agents having a low bulk density of <150 g/l, for example fumed silica or precipitated silica, are supplied via the annular gap preferably to an extent of at least 70% by weight, more preferably to an extent of about 100% by weight.

These antiblocking agents are preferably used in a relatively small amount of 0.1 to 5% by weight, based on the polymeric constituents of the polymer dispersion to be atomized.

The supply of the antiblocking agent via the annular gap is especially advantageous when only relatively small amounts of antiblocking agent are used, i.e. at preferably 0.1 to 5% by weight of antiblocking agent, based on the polymeric constituents of the polymer dispersion to be atomized. In this case, it is also preferable for at least 70% by weight, more preferably about 100% by weight, to be supplied via the annular gap.

The process is especially suitable for finishing of dispersion powders with finely divided and lightweight antiblocking agents, optionally in a mixture with further antiblocking agent.

Preference is therefore given to adding one or more antiblocking agents from the group comprising aluminum silicates such as kaolin, fumed silica or precipitated silica, which may optionally have been hydrophobized, and optionally in a mixture with one or more further antiblocking agents. The particle size of these antiblocking agents is preferably 0.01 to 5.0 μm in the case of the primary particles or 10 to 250 μm in the presence of agglomerates (mean particle diameter determined in each case by means of laser granulometry, for example by means of scattered light measurement in a Beckman Coulter LS laser particle analyzer). The bulk density of such antiblocking agents is <150 g/l.

The process according to the invention enables the addition of antiblocking agents very close to the atomizer disk, without disruptive internals in the dryer tower. Particularly when finely divided or lightweight antiblocking agents are used, or when small amounts of antiblocking agents are used, the coverage of the polymer particles with antiblocking agent is thus improved.

The following examples serve to further illustrate the invention:

Example 1

The spray-drying was effected in a commercial spray-drying tower with installed rotary atomizer (rotary atomization dryer) having a perforated disk (atomizer disk) analogously to FIG. 1.

The further technical data for the spray-drying were as follows: volume of the spray-drying tower about 500 m$^3$, feed rate about 4200 kg/h, peripheral speed of the atomizer disk about 140 m/s, drying air rate about 50000 m$^3$/h, conveying gas velocity of ABA 40 m/s, drying air inlet temperature about 160° C., drying air outlet temperature about 80° C.

An aqueous vinyl acetate/ethylene dispersion (polymer composition 80% by weight of vinyl acetate and 20% by weight of ethylene, solids content of the dispersion 52% by weight) was spray-dried after addition of 10% by weight, based on copolymer, of an aqueous polyvinyl alcohol solution having a Höppler viscosity of 4 mPas (in 4% aqueous solution, Höppler method at 20° C., DIN 53015) and a hydrolysis level of 88 mol %. In the course of this, the feed viscosity was adjusted by means of dilution water to 400 to 500 mPas (measured at 20° C. by means of a rotary viscometer at 20 rpm). The feed was preheated to 95° C. The antiblocking agent used was a finely divided, high-dispersity silica (HDK$^R$ H20) having a mean particle size of 10 to 250 μm (mean particle diameter determined by means of laser granulometry), and was added in an amount of 0.5% by weight, based on solids content of copolymer and polyvinyl alcohol. The silica and the conveying gas were mixed in a Venturi nozzle and conducted into the annular gap which was arranged around the atomizer housing with a gap width of 4 cm and had a vertical distance from the upper edge of the atomizer disk of 40 cm. In addition, 10% by weight of calcium carbonate (Omyacarb$^R$ 5GU), based on the solids content of copolymer and polyvinyl alcohol, was also added as an antiblocking agent with the drying air (hot air). The spray-drying was effected without any problem over 2 days and gave a free-flowing, blocking-stable powder. No caking was observed at the dryer wall. The amount of oversize, which was defined as powder particles larger than 1000 μm (those which are retained by a sieve having a mesh size of 1000 μm), was 0.1% by weight, based on the overall yield of polymer powder. By means of scanning electron microscopy, it was possible to verify that the silica completely and homogeneously covers the particle surface of the polymer particles.

Comparative Example 1

The procedure was as in example 1, except that the metal sheet which forms the annular gap was deinstalled and all of the antiblocking agent was supplied completely via the drying air. It was still possible to conduct the spray-drying without interruption for 2 days, but the amount of oversize (powder particles larger than 1000 μm) was 2.8% by weight. In addition, inspection of the dryer after the end of the drying showed moderately severe wall coverage.

Scanning electron microscopy showed much poorer (less complete) and less homogeneous coverage of the particle surface with silica.

Example 2

The procedure was as in example 1, with the difference that the vertical distance from the upper edge of the atomizer disk was increased to 80 cm.

The amount of oversize was 0.4% by weight, based on the overall yield of polymer powder.

The particle surface of the polymer particles was covered completely and homogeneously with antiblocking agent.

Example 3

The procedure was as in example 1, with the difference that no calcium carbonate was added via the drying air.

The amount of oversize was 0.2% by weight, based on the overall yield of polymer powder.

The particle surface of the polymer particles was covered completely and homogeneously with antiblocking agent. The blocking stability of the powder was good.

Comparative Example 2

The procedure was as in comparative example 1, with the difference that no calcium carbonate but rather only HDK$^R$ H20 was added via the drying air.

Very significant caking was observed at the dryer wall. The amount of oversize was 4.3% by weight, based on the overall yield of polymer powder.

The particle surface of the polymer particles was covered incompletely and sparsely with antiblocking agent.

The blocking stability of the powder was very poor.

Example 4

The procedure was as in example 1, with the difference that, rather than the finely divided silica, 5% by weight Kaolin (Burgess No.-20-SD$^R$) was added via the annular gap, and the amount of the calcium carbonate (Omyacarb$^R$ 5GU) added via the drying air was reduced to 5% by weight. The amount of oversize was 0.4% by weight, based on the overall yield of polymer powder.

The particle surface of the polymer particles was covered for the most part and homogeneously with antiblocking agent. Some of the kaolin had sunk into the polymer particle.

Example 5

The procedure was as in example 4, with the difference that the vertical distance from the upper edge of the atomizer disk was increased to 80 cm.

The amount of oversize was 0.2% by weight, based on the overall yield of polymer powder.

The particle surface of the polymer particles was covered completely and homogeneously with antiblocking agent. Only very few kaolin particles had sunk into the polymer particle.

Comparative Example 3

The procedure was as in example 4, with the difference that the metal sheet which forms the annular gap was deinstalled and all of the antiblocking agent was supplied completely via the drying air.

Moderately significant caking was observed at the dryer wall. The amount of oversize was 1.9% by weight, based on the overall yield of polymer powder.

The particle surface of the polymer particles was covered incompletely and inhomogeneously with antiblocking agent.

The blocking stability of the powder was poor.

It is apparent from the comparison of examples 1 or 2 with comparative example C1 that the addition of antiblocking agent very close to the atomizer disk leads to better coverage of the polymer particles and formation of less oversize. An identical result is shown by the comparison of example 4 or example 5 with comparative example C3.

Comparison of example 3 with comparative example C3 makes it particularly clear that the process according to the invention, particularly when finely divided or lightweight antiblocking agents, here HDK$^R$ H20, are used, and at the same time when small amounts of antiblocking agents are used, very good coverage of the polymer particles with antiblocking agent is nevertheless enabled, which leads to good blocking stability of the polymer powder.

In the particularly preferred embodiment, the formed part (metal sheet) which bounds the annular gap can be moved vertically in order to optimize the distance from the upper edge of the atomizer disk for the polymer dispersion to be dried and the antiblocking agent to be used. This was examined in example 1 and example 2, and in example 4 and example 5. For the antiblocking agents examined, HDK$^R$ H20 or kaolin, it is possible to set different distances between the lower edge of the annular gap and the upper edge of the atomizer disk if, for example, the amount of oversize formed is to be minimized.

The invention claimed is:

1. A process for producing a dispersion powder comprising the steps of spray-drying a quantity of aqueous polymer dispersions and adding a quantity of antiblocking agent in a rotary atomization dryer comprising a dryer tower, wherein the antiblocking agent is conveyed by compressed air, wholly or partly, into an annular gap which is formed by a formed part arranged concentrically around the housing of the rotary atomizer, and which ends at a distance above the upper edge of the atomizer disk of the rotary atomizer.

2. The process as claimed in claim 1, wherein the formed part which bounds the annular gap can be moved vertically.

3. The process as claimed in claim 1, wherein the gap width of the annular gap is 0.5 cm to 10 cm.

4. The process as claimed in claim 1, wherein the distance of the lower end of the formed part which bounds the annular gap from the upper edge of the atomizer disk is 0.01 to 1.0 m.

5. The process as claimed in claim 1, wherein a proportion of 0.5 to 100% by weight of the quantity of the antiblocking agent added is supplied via the annular gap.

6. The process as claimed in claim 1, further comprising the step of adding the proportion of antiblocking agent which is not conveyed into the annular gap to hot air supplied for drying in a hot air channel and/or directly into the dryer tower and/or subsequently to the dried dispersion powder.

7. The process as claimed in claim 1, wherein antiblocking agents having a low bulk density of <150 g/l are supplied via the annular gap to an extent of at least 70% by weight of the quantity of the antiblocking agent added.

8. The process as claimed in claim 1, wherein 0.1 to 5% by weight of antiblocking agents are added, based on the polymeric constituents of the polymer dispersion to be atomized, and at least 70% by weight of the quantity of antiblocking agents added is supplied via the annular gap.

9. The process as claimed in claim 1, wherein the antiblocking agents comprise one or more aluminum silicates, which have optionally been hydrophobized, optionally in a mixture with one or more further antiblocking agents.

10. The process as claimed in claim 9, wherein the antiblocking agent(s) is/are supplied via the annular gap to an extent of at least 70% by weight of the quantity of antiblocking agents added.

11. The process as claimed in claim 10, wherein the one or more aluminium silicates comprise one or more of kaolin, fumed silica, or precipitated silica.

12. The process as claimed in claim 9, wherein the one or more aluminium silicates comprise one or more of kaolin, fumed silica, or precipitated silica.

* * * * *